United States Patent [19]

Lavie

[11] Patent Number: 4,579,742
[45] Date of Patent: Apr. 1, 1986

[54] EFFERVESCENT MIXTURE CHARACTERIZED BY PROTRACTED RELEASE OF GAS AND THE USE OF THIS MIXTURE IN THE PREPARATION OF CARBONATED DRINKS

[76] Inventor: Louis Lavie, 6, avenue Dapples, CH-1006 Lausanne, Switzerland

[21] Appl. No.: 599,695

[22] Filed: Apr. 12, 1984

[30] Foreign Application Priority Data

Jun. 24, 1983 [CH] Switzerland ............. 3468/83
Nov. 24, 1983 [CH] Switzerland ............. 6308/83

[51] Int. Cl.⁴ ............................................. A23L 2/40
[52] U.S. Cl. .................................................. 426/96
[58] Field of Search ............... 426/96, 56, 591, 302; 424/33

[56] References Cited

U.S. PATENT DOCUMENTS

| | | | |
|---|---|---|---|
| 2,868,646 | 1/1959 | Schapiro | 426/96 |
| 3,649,298 | 3/1972 | Kreevoy et al. | 426/591 |
| 3,959,499 | 5/1976 | Harris et al. | 426/302 |
| 4,433,076 | 2/1984 | Bauer et al. | 424/33 |

*Primary Examiner*—Raymond Jones
*Assistant Examiner*—Elizabeth C. Weimar
*Attorney, Agent, or Firm*—Stevens, Davis, Miller & Mosher

[57] ABSTRACT

An effervescent mixture in powder or granulated or compressed form characterized in a protracted release of gas, a process for preparing it, and its use in hydrosoluble compositions in powder or granulated or compressed form for the preparation of carbonated drinks.

12 Claims, No Drawings

EFFERVESCENT MIXTURE CHARACTERIZED BY PROTRACTED RELEASE OF GAS AND THE USE OF THIS MIXTURE IN THE PREPARATION OF CARBONATED DRINKS

SUMMARY OF THE INVENTION

The invention refers to an effervescent mixture in powder or granulated or compressed form useful for the prolonged liberation of gas, at least one component of which is coated with a film containing a water-soluble polymer, preferably a macromolecular watersoluble polysaccharide.

The invention also refers to a process for the preparation of a carbonated mixture useful for the prolonged liberation of gas, as hereinabove described, which comprises coating at least one of the components of the mixture with a film containing a water-soluble polymer.

Finally, the invention refers to a water-soluble composition in powder or granulated or compressed form for the preparation of carbonated drinks, characterized in that it contains, as an ingredient, an effervescent mixture in powder or granulated form at least one component of which is coated with a film containing a water-soluble polymer.

BACKGROUND OF THE INVENTION

Many basic powder compositions used for the preparation of both medicinal and thirst-quenching drinks are currently available commercially.

In general, carbonated drinks are prepared by dissolving $CO_2$ under relatively high pressure in the liquid to be consumed. Maintaining the initial quantity of dissolved gas to which such drinks owe their "tingling" and thirst-quenching effect, necessitates the use of hermetically sealed containers which are capable of withstanding the internal pressure and are therefore relatively heavy and bulky, even for small quantities.

Effervescent mixtures in powder form are known which produce the same type of effect as that described above, with the exception that supersaturation of the liquid phase is virtually impossible under the conditions in which such drinks are usually prepared. It is impossible, using known mixtures, to prepare drinks in which $CO_2$ is evolved at a constant rate throughout the entire period required for consumption. After the initial effervescence has occurred, a drink prepared in this way rapidly loses its character and becomes "flat" and even insipid. The invention permits the drawbacks associated with known effervescent mixtures to be overcome advantageously.

PREFERRED EMBODIMENTS OF THE INVENTION

It has been discovered that a carbonated drink in which a gas ($CO_2$) is evolved throughout the entire average period required for consumption may be obtained by using an effervescent mixture at least one component of which is coated with a film containing a water-soluble polymer. In the absence of such a coating, the effervescent mixture begins to liberate all its gas immediately upon contact with water, until the aqueous phase is saturated with $CO_2$, the excess gas escaping into the atmosphere.

The water-soluble polymer may be, for example, a cationic copolymer derived from dimethylaminoethyl methacrylate and neutral aliphatic esters. A cationic copolymer, such as EUDRAGIT E 100, derived from dimethylaminoethyl methacrylate and neutral aliphatic esters of methacrylic acid, such as the methyl or butyl ester, may be used advantageously. Such products are known and may be obtained from specialized dealers. They are used principally in the pharmaceutical industry for coating active components with a rapidly disintegrating gastrosoluble film. Hence, they are perfectly tolerated by the body, non-toxic, and may therefore be used in compositions in powder or granulated or compressed form for the preparation of drinks without any special restrictions. The ratio of water-soluble film to mixture used should be calculated to produce a total, prolonged liberation of gas, generally of the order of 15 to 40 minutes. The effervescent mixture in powder form is generally coated by the usual techniques, such as spraying or the so-called fluidized bed process.

Certain water-soluble polymers may give rise to secondary phenomena, such as whitish cloudiness or overall coloration. Such phenomena are preferably acceptable in the case of opaque or deep-coloured drinks. In other cases, however, and particularly when a clear, pale-coloured aerated drink is required, it is preferable to use a macromolecular water-soluble polysaccharide as the water-soluble polymer.

The specific object of the invention is to obtain an effervescent mixture in powder or granulated or compressed form useful for the prolonged liberation of gas, characterized in that it has at least one component in the form of particles coated with a film containing a macromolecular water-soluble polysaccharide. A preferred coating film includes gum arabic or tragacanth gum, or a mixture of these two gums.

To obtain the effervescent mixture, salts or mixtures of salts of alkali or alkaline earth metals and carbonic acid and mineral or organic acids or mixtures thereof, currently known and used in the foodstuffs, and pharmaceutical industries may be used. For example, mixtures are used which contain sodium bicarbonate and one or more organic acids, such as tartaric acid and citric acid, or sodium bicarbonate and a mineral acid, such as phosphoric acid. The particles may also contain a mixture of acids, for example, carbonic acid and an amino acid.

According to the invention, an effervescent mixture in powder or granulated or compressed form useful for the prolonged liberation of gas is prepared by first dissolving the macromolecular polysaccharide in a concentrated saccharose syrup. Generally, a 100/60 to 100/50 (wt./wt.) syrup is used, and approximately 100 parts by weight of the polysaccharide are dissolved in approximately 150 to 400 parts by weight of the concentrated syrup.

Once a homogeneous liquor is obtained, a volume of 95% ethanol equal to the volume of water used in preparing the concentrated syrup is added gradually. This yields a whitish liquor which, in certain cases, it may be advisable to stabilize by storing it in an airtight container for 1 hour at a temperature of approximately 50° C. The coated product may be coloured by adding a food colorant to the liquor. This coloration provides a check on the uniformity of the coating.

An essential oil or a mixture of essential oils may also be incorporated in the liquor to impart an aroma to the mixture obtained after coating. In such cases, the above-mentioned essential oils may be advantageously incorporated in the liquor after dissolution in the above-mentioned volume of ethanol.

The proportions may be varied according to the origin and nature of the raw materials, but the proportion of sugar used must be sufficient to prevent the polysaccharide from solidifying in a lump on contact with the alcohol.

This liquor may be applied to one of the components whose function is to bring about liberation of CO2 by reaction, by the usual techniques, such as spraying or the so-called fluidized bed process.

Presented in powder or granulated or compressed form, effervescent mixtures coated in this way may be used as the basis for aeration of the most varied types of acidulated drinks.

The consumer of drinks aerated in this way may adjust the rate of liberation of CO2 and, consequently, the tingling effect to suit his personal taste, by simply stirring the liquid gently with a straw.

Without stirring, the discharge of CO2 is constant but not excessive; only a minimal quantity of gas escapes from the surface. If the drink is left standing for 10 minutes the consumer will find that it has not become flat but saturated at the ambient atmospheric pressure. The slightest stirring will increase the production of CO2 and confer a "tingling" sensation similar to that of bottled drinks aerated under a pressure of several atmospheres.

These results are obtained by using an effervescent mixture containing 1.20 g of sodium bicarbonate and sodium monophosphate per 100 ml of drink.

Apart from the above-mentioned ingredients, the composition in powdered or granulated or compressed form for the preparation of aerated drinks may also contain essential oils, such as oil of cinnamon, oil of lemon, and oil of orange, adsorbed on a solid support, in variable proportions depending on the required flavour and aroma. It may also contain suitable food colorants, sugar—preferably instant sugar, or any other additive necessary to achieve the desired organoleptic effects.

All the essential ingredients are mixed in proportions such that 2.5 to 14 g of the final composition suffice for the preparation of 100 ml of aerated drinks, the weight depending upon whether the drink is Diet or Soft.

The following examples provide a more detailed illustration of the invention without, however, limiting it.

EXAMPLE 1

Two equivalent of sodium bicarbonate were coated with a water-soluble polymer film of EUDRAGIT E 100 (registered trademark of Rohm & Haas, Pharma GmbH, Darmstadt, Federal Republic of Germany) by the so-called fluidized bed process (proportions: approximately 25 g of EUDRAGIT E 100 for 100 kg of basic product).

The powdered product obtained was then mixed with 1 equivalent of tartaric acid.

EXAMPLE 2

One equivalent of powdered tartaric acid was coated with a water-soluble polymer film as described in Example 1.

The powdered product obtained was then mixed with 2 equivalents of sodium bicarbonate.

EXAMPLE 3

A mixture of tartric acid (1 equivalent) and sodium bicarbonate (2 equivalent) have been coated, seperately, with a water soluble polymer film described in example 1.

An analogous effect was observed when the tartaric acid in the above examples was partially or completely replaced by an equivalent quantity of citric acid.

The same effect was also achieved when the above-mentioned organic acid was partially or completely replaced by an equivalent quantity of sodium monophosphate.

EXAMPLE 4

25 g of gum arabic are incorporated in a sugar syrup obtained by dissolving 25 g of sugar in 15 g of water.

After thorough mixing, 15 ml of 95% ethanol are added. The liquor then assumes a whitish tinge.

If desired, this liquor may be coloured, for example by adding corn starch caramel or a caramel colorant.

If desired, the mixture obtained may be stored in an airtight container for 1 hour at 50° C. before application of the coating.

Sodium bicarbonate in powder form is then coated by thoroughly mixing the particles with the liquor obtained as above, in the proportions of 1 ml of liquor to approximately 10 g of bicarbonate.

After thorough mixing, this mixture is pressed through a mould or a sieve in order to obtain uniform granules of the required cross-section which are subsequently dried for 2 to 3 hours in a hot-air oven controlled at 50° C.

EXAMPLE 5

20 g of tragacanth gum are added to a syrup obtained by dissolving 25 g of sugar and 25 g of sugar caramel in 75 ml of water. After thorough mixing, 25 ml of 95% ethanol are added.

The liquor obtained is stored in an airtight container for 1 hour at 50° C., and then treated as described in Example 4.

If required, the colour of the liquor may be intensified by adding a caramel colorant.

Two equivalents of coated sodium bicarbonate granules are mixed with 1 equivalent of tartaric acid. When placed in aqueous medium, the effervescent mixture obtained liberates CO2 for a period of 20 to 30 minutes, which seems adequate. This period may be prolonged by applying thicker coatings.

The particles may also be coated with tartaric acid by the same method.

EXAMPLE 6

A liquor was prepared from the following ingredients, following the procedure described in Example 4:

| | |
|---|---|
| sugar | 40 g |
| caramel | 10 g |
| gum arabic | 40 g |
| tragacanth gum | 10 g |
| water | 75 ml |
| 95% ethanol | 30 ml |

After thorough mixing, a coating was applied to a mixture of the following acids, in the proportions of 5 ml of liquor to 50 g of acid mixture:

| | | |
|---|---|---|
| phosphoric acid | 3 g | 6% |
| tartaric acid | 30 g | 60% |

-continued

|  |  |  |
|---|---|---|
| citric acid | 17 g | 34% |
|  | 50 g | 100% |

Drying was carried out on a screen, using a current of hot air.

It was also observed that the liquor used in Examples 4 to 6 afforded excellent protection to hygroscopic products. It can therefore be used advantageously either as a coating product or as a support in the foodstuffs industry, for example in the manufacture of candy.

The foregoing examples also can be expressed on the basis of 100 parts by weight of macromolecular water-soluble polysaccharide or mixture of macromolecular water-soluble polysaccharides instead of grams.

Taking Example 5 as typical, it will be appreciated that the corresponding parts by weight can be expressed as follows:

| Ingredients Used | Amount | Multiplier | Amount Based on 100 parts by weight macromolecular or mixture of macromolecular water-soluble polysaccharides |
|---|---|---|---|
| Tragacanth Gum | 20 g | × 5 | = 100 |
| Sugar | 25 g | × 5 | = 125 |
| Sugar Caramel | 25 g | × 5 | = 125 |
| Water | 75 ml (75 g) | × 5 | = 375 |
|  |  | Total | 625 parts by wt. |

It will readily be appreciated that the mixture of sugar and sugar caramel in water, expressed in parts by weight, will be $(125+125)/375 = 250/375 = 100/150$.

With regard to Example 4 it will be appreciated that:

| Ingredients Used | Amount | Multiplier | Amount Based on 100 Parts by weight of macromolecular or mixtures of macromolecular water-soluble polypolysaacharides |
|---|---|---|---|
| Gum Arabic | 25 g | × 4 | = 100 |
| Sugar | 25 g | × 4 | = 100 |
| Water | 15 g | × 4 | = 60 |

Thus, it will be apparent that the mixture of sugar in water for this example, expressed in parts by weight, will be 100/60 and that the syrup of saacharide solution will be about 160 parts by weight.

From the foregoing examples it can be observed that the volume of 95% ethanol to water can vary from 25 ml/75 ml, or about 33%, in Example 5 to 15 ml/15 g (15 ml), or about 100%, in Example 4.

What I claim is:

1. Method for preparing a powdered effervescent mixture for diet or soft drinks containing at least two ingredients in particulate form which react each with the other in the presence of water to evolve gas, which comprises:
   (a) dissolving approximately 100 parts by weight of a macromolecular water-soluble polysaccharide or mixture of macromolecular water-soluble polysaccharides in about 160 to 625 parts by weight of a solution comprising a 100/60 to 100/150 wt./wt. syrup of saccharose in water;
   (b) adding a volume of 95% ethanol comprised between about 33 and about 100% of the volume of the water present in said solution gradually, while stirring, to form a liquor;
   (c) storing the thus obtained liquor in an airtight container for 1 hour at a temperature of about 50° C.;
   (d) separately coating the particles of each of said ingredients with the liquor resulting from step (c);
   (e) separately drying the thus coated particles; and
   (f) mixing together the dried coated particles in the desired proportions.

2. Method according to claim 1, wherein the macromolecular water-soluble polysaccharide is gum arabic, said dissolving comprises dissolving 100 parts in about 160 parts by weight of a solution comprising a 100/60 wt./wt. syrup of saccharose in water, and wherein the volume of 95% ethanol added to the solution represents about 100% of the volume of the water present in said solution.

3. Method according to claim 1, wherein the macromolecular water-soluble polysaccharide is tragacanth gum, said dissolving comprises dissolving 100 parts in about 625 parts by weight of a solution comprising a 100/150 wt./wt. syrup of saccharose in water, and wherein the volume of 95% ethanol added to the solution represents about 33% of the volume of the water present in said solution.

4. Method according to claim 1, wherein the mixture of macromolecular water-soluble polysaccharides is a 40/10 wt./wt. mixture of gum arabic and tragacanth gum, said dissolving comprises dissolving 100 parts in about 250 parts by weight of a solution comprising a 100/150 wt./wt. syryp of saccharose in water, and wherein the volume of 95% ethanol added to the solution represents about 40% of the volume of the water present in said solution.

5. Method according to claim 1, wherein the particles comprise particles of a salt or a mixture of salts of carbonic acid and particles of mineral acid and/or an organic acid, and said separate coating comprises separately coating the particles of a salt or a mixture of salts and separately coating the particles of mineral acid and/or organic acid.

6. Method according to claim 5, wherein the salt of carbonic acid is an alkaline carbonate or bicarbonate or an alkaline earth carbonate or a salt of carbonic acid and an amino acid.

7. Method according to claim 5, wherein the organic acid is citric and/or tartaric acid, and that the mineral acid is phosphoric acid.

8. Method according to claim 1, which comprises coating the particles by mixing them or spraying them with the liquor resulting from step (c).

9. A method according to claim 1, wherein said syrup of saccharose comprises a saccharose selected from the group consisting essentially of sugar and a mixture of sugar and caramel dissolved in water.

10. A method according to claim 2, wherein said syrup of saccharose comprises a saccharose selected from the group consisting essentially of sugar and a mixture of sugar and caramel dissolved in water.

11. A method according to claim 3, wherein said syrup of saccharose comprises a saccharose selected from the group consisting essentially of sugar and a mixture of sugar and caramel dissolved in water.

12. A method according to claim 4, wherein said syrup of saccharose comprises a saccharose selected from the group consisting essentially of sugar and a mixture of sugar and caramel dissolved in water.

* * * * *